United States Patent Office 3,193,578
Patented July 6, 1965

---

3,193,578
N₂-SUBSTITUTED HYDRAZIDES AS MONO-AMINE OXIDASE INHIBITORS
Paul Coirre, 5 Blvd. du Montparnasse, Paris, France
No Drawing. Filed July 5, 1961, Ser. No. 121,843
Claims priority, application France, July 15, 1960, 833,027
5 Claims. (Cl. 260—559)

The present invention relates to N₂-substituted hydrazides, which are inhibitors of the mono-amine-oxidase intended notably for psychiatric and cardiologic use and obtained by synthesis of a hormone of vegetable growth, also called acid for regulating the growth of vegetables, with a radical promoting the inhibition of the mono-amino-oxidase.

This invention is concerned more particularly with the isopropyl-hydrazide of the p-chlorophenoxy-acetic acid which may be obtained by synthesis of a hormone of vegetable growth, the p-chlorophenoxyacetic acid, with the isopropyl-hydrazide radical.

It is also concerned with the synthesis of other hormones of vegetable growth, notably:

The 2,4-dichlorophenoxyacetic acid
The 2,4,5-trichlorophenoxyacetic acid
The methyl-2-chloro-4-phenoxyacetic acid with the same isopropyl-hydrazide radical, which yields substances having the same mono-amine oxidase inhibiting properties.

Other radicals than the isopropyl-hydrazide may be used for synthetizing from hormones of vegetable growth substances promoting the inhibition of the mono-amin-oxidase, provided that these radicals contain at least the NH—NH group in their formula. The general formula of these substances, which are the N₂-substituted hydrazides according to the invention is:

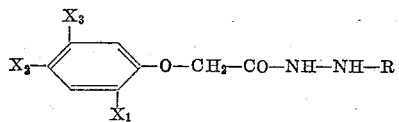

wherein $X_1$ is selected from the group consisting of H, Cl and $CH_3$, $X_2$ is Cl, $X_3$ is seleced from the group consisting of H and Cl, and R is isopropyl.

The formulae of the isopropyl-hydrazide of the p-chlorophenoxyacetic acid and of its derivatives for which R in the hereinabove formula is the isopropyl radical, are as follows:

Isopropyl-hydrazide of p-chlorophenoxyacetic acid ($C_{11}H_{15}N_2O_2Cl$)

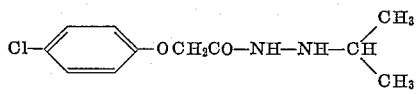

In the following formulae R₁ represents the radical

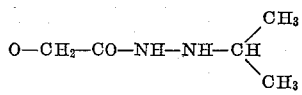

Isopropyl-hydrazide of 2,4-dichlorophenoxyacetic acid:

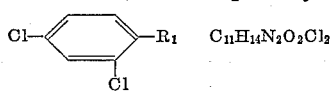     $C_{11}H_{14}N_2O_2Cl_2$

Isopropyl-hydrazide of 2,4,5-trichlorophenoxyacetic acid:

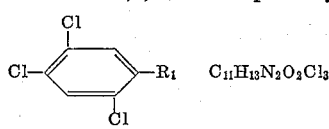     $C_{11}H_{13}N_2O_2Cl_3$

Isopropyl-hydrazide of 2 - methyl-4-chloro-phenoxyacetic acid:

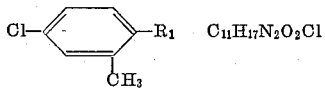     $C_{11}H_{17}N_2O_2Cl$

PHYSICO-CHEMICAL CHARACTERS OF COMPOUND I (a) Colorless crystals

Melting point: 194° F.–197.6° F.
Moderately soluble in distilled water in the cold state: 1 part per 1000 parts; much more soluble in the heated state: 1 part per 300 parts. The solubility is not appreciably influenced by acidification or alkalinisation.
Solubility in 95°-alcohol: 1 part in 50 parts.
Soluble in chloroform and acetone.
Scarcely soluble in ethyl ether.
Insoluble in petroleum ether.

(b) *Liebermann-Burchard test.*—*immediate wine-color turning to light dull green when heated in a water bath*

Crump reaction: the chloroform takes a yellow color.
No color is formed by the addition of nitric acid, sulfuric acid, iron perchloride.
Reduction of the Fehling liquor in the heated state.
Messler reaction: yellow precipitate becoming gray.
Reduction of the ammonia silver nitrate: a black precipitate appears, without any preliminary white precipitate.
The compound decolorizes the potassium permanganate in a sulfuric medium.
It decolorizes the iodinated water in the presence of sodium bicarbonate.

METHOD OF PREPARING COMPOUND I (1) *Ethyl p-chlorophenoxyacetate*

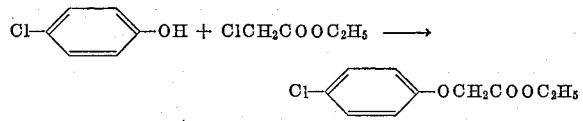

49 grams of p-chlorophenol are condensed with 47 grams of ethyl chloroacetate in a basic medium (sodium ethylene) at boiling temperature. After purification, 35.7 grams of solid product melting at 45° C. (113° F.) are obtained, with a 44% yield.

(2) *p-Chloro-phenoxyacetic hydrazide*

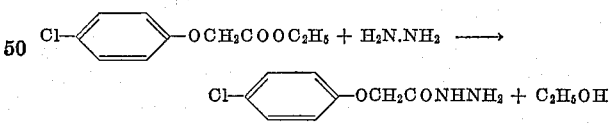

The ethyl p-chloro-phenoxyacetate is treated with a small hydrazine excess in an alcoholic medium and under such conditions that the condensed liquid flows back, at the boiling temperature. The hydrazide crystallizes after cooling. From 17.1 grams of ester 13.8 grams of hydrazide are obtained. M.P.=158°–159° C. (316–318° F). Yield=86.7%.

(3) *Acetonic hydrazone of p-chloro-phenoxyacetic acid*

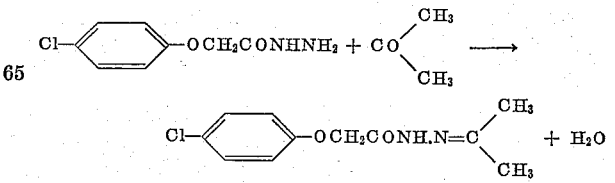

By reflux heating at boiling temperature during 12 hours with a large excess of acetone, the hydrazide provides hydrazone with a nearly quantitative yield.

M.P.=144–145° C. (292–294° F.). Calc. C, 54.88% (theor. 54.36), Calc. H, 5.40% (theor. 5.62).

*(4) N-isopropylhydrazide of p-chlorophenoxyacetic acid*

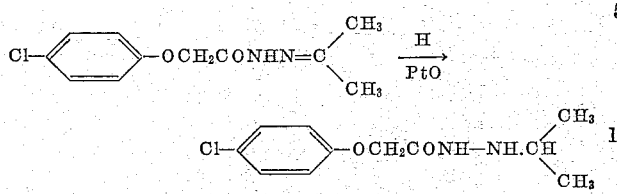

By catalytic reduction in the presence of platinum oxide according to the Adams process in an alcoholic medium (under a pressure of 2 m. of water) 3 grams of product are obtained from 5 grams of hydrazone. Yield=60%. The aggregate yield is 23%.

The other $N_2$-substituted hydrazides according to the invention are obtained by a similar process, starting from the convenient phenol and utilizing in the step (3) of the process the appropriate ketone or aldehyde in view of providing through the step (4) the desired R radical.

PHARMACOLOGICAL PROPERTIES OF COMPOUND I

*(1) Lethal dose 50*

The lethal dose 50 determined in 24 hours in a mouse is 177.5 mg./kg. through the intra-peritoneal way.

*(2) Criteria of pharmacological activity*

The product acts as an inhibitor of the monoamine-oxidase.

As a matter of fact, (a) In a mouse, 10 mg./kg. administered as an intra-peritoneal injection (I.P.) dose, 1 hour, 4 hours or 18 hours before the reserpine (0.75 mg./kg. as a sub-cutaneous (S.C.) injection), counteracts the ptosis normally caused by the reserpine.

(b) In a mouse, when administered by I.P. 1 hour before 100 mg./kg. of 5 hydroxy-tryptophan (through the same way) at the dose of 1 mg./kg., it increases the motorial activity, it produces an excitation syndrome in 80 animals out of 100 at the dose of 5 mg./kg. and in 100% of mice at the dose of 25 mg./kg.

(c) In a rat, the I.V. (intravenous) administration of tryptamine (5 mg./kg.) produces convulsions in 80% of the cases, 1 hour and 4 hours after the I.P. administration of 25 mg./kg. of the product, in 100% of the cases 4 hours after 50 mg./kg. (I.P.), in 100% of the cases 4 hours after the oral administration of 10 mg./kg., in 50% of cases 18 hours after the oral administration of 10 mg./kg.

(d) In a rabbit, administered per os, at the dose of 75 mg./kg. 3 hours before, it counteracts the effects of reserpine and causes a syndrome of excitation attended by mydriasis and hyperpyrexia.

The same effect is obtained by I.V. of 25 mg./kg., 1 hour before the injection of reserpine.

The product may therefore be considered as an inhibitor of mono-amine oxidase of which the activity is, with respect to isopropyl-hydrazide of isonicotinic acid (Marsilid), 6 to 25 times greater in the 5 hydroxy-tryptophan test with a mouse, 4 times greater in the reserpine test with a rabbit, 3 times greater in the tryptamine test with a rat.

It is an inhibitor of the monoamine-oxidase, and its effects are both rapid (1 hour) and lasting (18 hours at least).

*(3) Action exerted on the cardio-vascular system*

In a chloralosed dog the product (10 mg./kg.) does not produce appreciable variations in the arterial pressure, in spite of a reduction in the cardiac output, due to an increase in the peripheral vascular resistance.

On the other hand, it reduces the aggregate cardiac effort and the oxygen consumption measured with the Benedict apparatus.

These effects on the cardio-vascular system distinguish the product from the other hitherto known inhibitors of the monoamine-oxidase, such as Marsilid and Tersavid.

THERAPEUTIC APPLICATIONS OF COMPOUND I

Inhibitor of the monoamine-oxidase which is effective in the following cases:

(A) *Psychiatry*

DEPRESSIVE SYNDROME

Melancholic, reactive and neutrotic depressions, involutional and senile depressions, depressions by exhaustion or asthenia.

Maniaco-depressive psychosis, in depressive phase.

Failures and insufficient results, consolidation of the therapeutic effect, prevention and relapses in convulsivo-therapy.

Schizophrenia in case of passivity, apragmatism, indifference to oneself and to one's surrounding, whether spontaneous or resulting from neuroleptic treatments.

Obsessional, phobic and hypochondriatic syndromes.

Mental anorexia.

As an adjuvant in detoxication cures (alcohol and opium).

Epilepsy.

Depressive state as a result of menopause and cancer.

(B) *Cardiology*

ANGORS OF EFFORT

Angors of decubitus.

Angors of persons suffering from high blood pressure.

OTHER FORMS OF ANGORS

Arterial hypertension.

Intermittent limping due to arthritis in the lower limbs.

(C) *Other indications*

Loss of weight, of appetite.

Bacteriostatic and bacteriolytic action against the bacilli of Koch.

Senescence.

Rheumatic arthritis.

EXAMPLES OF THERAPEUTIC APPLICATION (a) *Psychiatric application.*—Reactive depression: 20 mg. per os per day during one week, 10 mg. the following two weeks. The symptoms disappeared.

(b) *Cardiologic application.*—Angor of effort: 30 mg. per day per os, the pain disappeared after 2 days. Maintenance treatment: 10 mg. per day.

(c) *Other applications.*—Loss of weight: 10 mg. per day per os, recovery of appetite and weight.

The treatment may be administered by oral route in the form of tablets containing .01 g. of product and .09 gram of excipient.

What I claim is:

1. An $N_2$-substituted hydrazide of the formula.

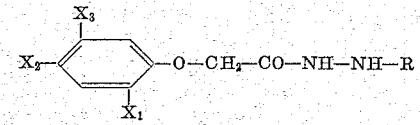

wherein $X_1$ is selected from the group consisting of H, Cl and $CH_3$, $X_2$ is Cl, $X_3$ is selected from the group consisting of H and Cl, and R is isopropyl.

2. Isopropyl-hydrazide of p-chlorophenoxyacetic acid,

3. Isopropyl-hydrazide of 2,4-dichlorophenoxyacetic acid.

4. Isopropyl-hydrazide of 2,4,5-trichlorophenoxyacetic acid.

5. Isopropyl-hydrazide of 2-methyl-4-chlorophenoxy-acetic acid.

References Cited by the Examiner

UNITED STATES PATENTS

| | | | |
|---|---|---|---|
| 2,716,663 | 8/55 | Beman | 260—559 |
| 2,763,684 | 9/56 | Beman | 260—559 |
| 2,890,984 | 6/59 | Sahyun | 167—65 |
| 2,937,118 | 5/60 | Haxthausen | 167—65 |
| 2,999,880 | 9/61 | Wheatley et al. | 260—559 |
| 3,007,962 | 11/61 | Metivier | 260—559 XR |

OTHER REFERENCES

Baltazzi et al.: Compt. rend., vol. 241, pp. 633–5 (1955).

Biel et al.: Jour. Am. Chem. Soc., vol. 81, pp. 2805–13 (1959).

Byrkit et al.: Ind. Eng. Chem., vol. 32, pp. 1862–1865 (1950).

Thompson et al.: Botanical Gazette, vol. 107 p. 494 (1946).

Wiley et al.: Jour. Org. Chem., vol. 24, pp. 1925–8 (1959).

Zeller et al.: Annals of New York Academy of Science, vol. 80, article 3, pp. 555–567, September 17, 1959.

WALTER A. MODANCE, *Primary Examiner.*

DUVAL McCUTCHEN, NICHOLAS S. RIZZO, FRANK CACCIAPAGLIA, Jr., *Examiners.*